(12) United States Patent
Iwata

(10) Patent No.: US 6,908,270 B1
(45) Date of Patent: Jun. 21, 2005

(54) SELF-LOCKING BOLT

(75) Inventor: Kiyotaka Iwata, Shinagawa-Ku (JP)

(73) Assignee: Iwata Bolt Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/614,849

(22) Filed: Jul. 12, 2000

(30) Foreign Application Priority Data

| Jul. 12, 1999 | (JP) | ................................. 11-197675 |
| Sep. 14, 1999 | (JP) | ................................. 11-261004 |
| Feb. 23, 2000 | (JP) | ............................. 2000-045885 |

(51) Int. Cl.⁷ ........................................... F16B 25/00
(52) U.S. Cl. ........................ 411/188; 411/399; 411/959
(58) Field of Search ........................ 411/378, 399, 959, 411/184–189; 401/161, 162

(56) References Cited

U.S. PATENT DOCUMENTS

| 844,750 | A | * | 2/1907 | Rieschick | .................. 411/188 |
| 1,923,647 | A | * | 8/1933 | Vera | ............................ 411/188 |
| 2,037,586 | A | * | 4/1936 | Olsen | .......................... 411/188 |
| 2,128,757 | A | * | 8/1938 | Olsen | .......................... 411/187 |
| 2,833,326 | A | * | 5/1958 | Knohl | ..................... 411/959 X |
| 3,438,417 | A | * | 4/1969 | Albris | ..................... 411/959 X |
| 3,540,509 | A | * | 11/1970 | Gutshall | .................. 411/959 X |
| 3,825,051 | A | * | 7/1974 | Sigmund | .................... 411/188 |
| 4,034,788 | A | * | 7/1977 | Melone | .................. 411/959 X |
| 4,220,188 | A | * | 9/1980 | McMurray | .................. 411/188 |
| 4,223,711 | A | * | 9/1980 | Tabor | ........................ 411/188 |
| 4,842,463 | A | * | 6/1989 | Landt | ......................... 411/188 |
| 5,183,359 | A | * | 2/1993 | Barth | ......................... 411/188 |
| 5,482,418 | A | * | 1/1996 | Giannuzzi | ................... 411/184 |
| 6,361,259 | B1 | * | 3/2002 | Koeppel et al. | ............ 411/399 |
| 6,394,725 | B1 | * | 5/2002 | Dicke | ......................... 411/399 |

FOREIGN PATENT DOCUMENTS

JP 2-89805 * 3/1990 ........... F16B 25/00

* cited by examiner

Primary Examiner—William L. Miller
(74) Attorney, Agent, or Firm—Ladas & Parry

(57) ABSTRACT

A self-locking bolt has a head with a bearing surface and a threaded part extending from the bearing surface and provided with an external thread of a pitch P for fastening to a first member when the head and threaded part are rotated in a fastening direction. There are n locking projections or recesses at equal angular intervals on the bearing surface, heights or depths of the locking projections or recesses from the bearing surface increasing or decrease gradually in a direction opposite the fastening direction from maximums to minimums with edges of the locking projections or recesses at junctions of the bearing surface and end walls of the locking projections or recesses at the maximums. The maximum height of the edge of the locking projections from the bearing surface of the head is nearly equal to and less than P/n. A second member that is between the bearing surface and the first member when the head and threaded part are rotated in the fastening direction bulges into the locking recesses.

6 Claims, 14 Drawing Sheets

SELF-LOCKING BOLT

BACKGROUND OF THE INVENTION

1. Field of the Invention

The present invention relates to a bolt (member with an external thread) and a nut (member with an internal thread). More particularly, the present invention relates to a bolt to be attached to a part by welding or staking and a nut to be attached to a part by welding or staking in assembling an automobile or the like. The present invention relates also to a bolt (member with an external thread) capable of quickly screwed in a mating nut (member with an internal thread). Particularly, the present invention relates to a self-locking bolt of a small nominal size.

2. Description of the Related Art

Techniques relating to a first aspect of the present invention will be explained.

When fastening together parts in assembling an automobile for mass production, a nut is attached previously to one of the parts by welding or staking and a mating bolt is screwed in the nut or bolt is attached to one of the parts by welding or staking and a mating nut is screwed on the bolt.

In some cases, metal particles sputtered by a welding operation or paint particles scattered by a painting operation adhere to the screw thread of the nut or the bolt previously attached to a plate, and the metal particles or the paint particles obstruct the engagement of the bolt and the nut.

The following methods of preventing such a trouble have been proposed.

(1) A method covers a screw thread formed on a threaded member attached to a plate with a mask formed by masking or capping to prevent the adhesion of sputtered metal particles or scattered paint particles to the screw thread. This method, however, increases the cost and the mask is caused to adhere firmly to the threaded member by the high temperature heat of the sputtered metal particles.

(2) A method coats the screw thread of a threaded member with a special coating to make it difficult for sputtered metal particles to adhere to the screw thread. This method, however, is costly.

(3) A method removes metal particles or paint particles adhering to the screw thread of the threaded member by tapping before engaging the mating threaded members. This method, however, needs an additional process increasing the cost. Moreover, this method may damage the screw thread and reduce the strength of the screw thread.

(4) A method that screws a bolt in a nut previously attached to a member forms a tapered end part in the bolt, and forms at least one recess in the tapered end part of the bolt. Although effective in coping with minute deposits, this method is unable to cope with large deposits firmly adhering to the screw thread.

(5) A method that screws a nut on a bolt previously attached to a member forms at least one axial groove in the internal thread of the nut between the opposite end surfaces of the nut to receive deposits removed from the screw thread of the bolt in the axial groove. The axial groove or grooves reduce the strength of the internal thread.

Techniques relating to a second aspect of the present invention will be explained.

When fastening together a mating threaded members in a mass-production line, such as an automobile assembling line, a fastening tool capable of rotating the threaded member at a high rotating speed is employed to achieve assembling work efficiently. When an operator fastens together the mating threaded members under an unfavorable working condition, the operator is obliged to work in an unstable position. Therefore, in some cases, the external thread is applied improperly to the mating internal thread and the external thread is screwed obliquely in the internal thread causing galling or seizure in the mating threaded members.

The following bolts have been proposed to prevent oblique engagement, galling and seizure.

(1) A-bolt 250 shown in FIG. 19 has a cylindrical tip portion 251 of a diameter slightly smaller than the minor diameter of the internal thread of a mating nut. Therefore, this bolt 250 can be screwed in the mating nut only along the axis of the nut. Although the cylindrical tip portion 251 is expected to be effective in preventing screwing the bolt 250 obliquely in the nut, the same is not effective measure for preventing galling and seizure.

(2) A bolt 252 shown in FIG. 20 has a tapered guide portion 253. When the tapered guide portion 253 is screwed in a mating nut, the bolt 252 is unsteady and hence the bolt 252 cannot be prevented from being obliquely screwed in a mating nut.

In some cases, a fastening tool is applied to the head of a bolt applied to a mating nut with its axis inclined to that of the nut and the bolt is rotated by the fastening tool for screwing. In such a case, the bolt is engaged obliquely with the nut causing the galling or seizing of the screw threads. Consequently, the bolt cannot be smoothly screwed in the nut, which reduces the efficiency of fastening work.

Techniques relating to a third aspect of the present invention will be explained.

Bolts are used under various working conditions and hence methods of preventing loosening or unfastening of bolts meeting the working conditions must be contrived. For example, a bolt of a large nominal size is used in combination with a mating nut having a partly deformed internal thread so that the external thread of the bolt and the partly deformed internal thread of the nut interfere with each other to prevent the bolt from loosening. However, it is difficult to form a partly deformed internal thread as locking means in a small nut to be used in combination with a bolt of a small nominal size. Therefore, the external thread or the bearing surface of the head of a bolt of a small nominal size is processed to provide a locking means.

The following locking means are incorporated into conventional self-locking bolts of small nominal sizes.

(1) Teeth are formed in the circumference of the bearing surface of the head of a bolt. The teeth of the head of the bolt sink in a surface of a member in contact with the bearing surface of the head of the bolt when the bolt is fastened.

(2) A plurality of wave-shaped projections are formed along a circle on the bearing surface of the head of a bolt. The wave-shaped projections sink in a surface of a member in contact with the bearing surface of the head of the bolt when the bolt is fastened.

Those locking means are effective only when the bolts provided with those locking means are used in combination with members of specific materials. Those locking means are not necessarily effective when the bolts are used in combination with members of various materials which are used in recent years.

SUMMARY OF THE INVENTION

An object of a first aspect of the present invention is to solve those problems in the prior art and to provide a bolt and a mating nut that can be engaged even if metal particles or paint particles adhere to the screw thread thereof.

To achieve the object of the first aspect of the present invention, a bolt according to the first aspect of the present invention has a regularly threaded part provided with a regular external thread capable of being regularly engaged with an internal thread formed in a mating nut, and a cylindrical guide part having a diameter smaller than the minor diameter of the internal thread of the nut and contiguous with the regularly threaded part, wherein the cylindrical guide part is provided with a recess in its end surface.

The recess may be formed by axially cutting an end part of the cylindrical guide part.

Longitudinal grooves may be formed in the circumference of the cylindrical guide part.

The regularly threaded part may be provided with grooves having a length corresponding to at least one screw thread of the regular external thread and formed in a portion thereof contiguous with the cylindrical guide part. The grooves may be formed in a length corresponding to one to three screw threads of the regular external thread in a portion of the regularly threaded part contiguous with the cylindrical guide part.

A nut according to the present invention has a threaded bore provided with an internal thread that can be engaged with the external thread of a mating externally threaded member, wherein the threaded bore has a leading section that is engaged first with the external thread of the mating externally threaded member, provided with a plurality of recesses having a length equal to at least one pitch of the internal thread and arranged at equal angular intervals, and a regularly threaded section continuous with the leading section.

Preferably, the sum of the circumferential lengths of the recesses is not shorter than half the circumferential length of the regularly threaded section.

Preferably, the radial depth of the recesses is in the range of a value equal to the height of the internal thread of the regularly threaded section and a value twice the height of the internal thread of the regularly threaded section.

Preferably, the axial length of the recesses formed in the leading section of the threaded bore is equal to one to two pitches of the internal thread.

The cylindrical guide part of the bolt according to the first aspect of the present invention is inserted in the leading part of the mating nut while the same is being turned by a fastening tool. Since the diameter of the cylindrical guide part is slightly smaller than the minor diameter of the internal thread of the mating nut, the cylindrical guide part is inserted in the internal thread scarcely forming gap between the cylindrical guide part and the internal thread. Since the end part of the bolt engages first with the leading part of the nut, metal parts and the like adhering to the internal thread can be removed before the regularly threaded part of the bolt comes into engagement with the internal thread, so that the regularly threaded part of the bolt can be smoothly screwed in the internal thread of the nut. Most of metal particles and the like adhering to the internal thread of the mating nut are removed previously from the internal thread before the regularly threaded part of the bolt comes into engagement with the internal thread, and metal particles and the like remaining on the internal thread can be scraped off by the sharp edges of the recesses formed in the regularly threaded part of the bolt.

In the nut in accordance with the first aspect of the present invention, the recesses formed by cutting portions of the internal thread have sharp edges. Therefore, metal particles and the like adhering to the external thread of the mating bolt can be removed before a regularly threaded part of the internal thread comes into engagement with the external thread of the bolt, so that the internal thread of the nut and the external thread of the bolt can be smoothly engaged without requiring excessive force.

An object of a second aspect of the present invention is to solve the problems in the prior art and to provide a bolt capable of permitting high-speed fastening and of fastening members together at a high fastening efficiency to reduce the assembling cost.

To achieve the object of the second aspect of the present invention, a bolt according to the first aspect of the present invention has a head against which a fastening tool is pressed to screw the bolt in a threaded bore of a mating internally threaded member provided with an internal thread, a cylindrical guide part of a diameter smaller than the minor diameter of the internal thread of the mating internally threaded member, a regularly threaded part that engages regularly with the internal thread of the mating internally threaded member, and a threaded guide part formed between the cylindrical guide part and the regularly threaded part, provided with an external thread having rounded crests, and having a major diameter greater than the diameter of the cylindrical guide part and smaller than the major diameter of the external thread of the regularly threaded part.

The external thread of the threaded guide part may be the same in pitch and lead angle as that of the regularly threaded part.

The external thread of the threaded guide part may have a screw thread form that can be included in the screw thread form of the external thread of the regularly threaded part when the former is superposed on the latter.

The major diameter of the external thread of the threaded guide part at a position on the axis nearer to the head of the bolt may be greater than that of the same at a position on the axis nearer to the extremity of the bolt, and the external thread of the threaded guide part may have at least two major diameters.

The external thread of the threaded guide part may have a single major diameter.

The radius of curvature of rounded crests of the external thread of the threaded guide part in a screw thread form may be in the range of 20% to 60% of the pitch.

The edge of the end surface of the cylindrical guide part may be rounded in a radius of curvature equal to 50% of the pitch or above.

When the cylindrical guide part of the bolt according to the second aspect of the present invention is applied obliquely to the threaded hole of a mating nut while the same is being rotated by a fastening tool pressed against the head of the bolt, the cylindrical guide part of the diameter smaller than the minor diameter of the internal thread of the nut does not bite into the internal thread of the nut and the position of the bolt relative to the nut is corrected in an early stage of screwing the bolt in the nut. Since the crests of the external thread of the threaded guide part are rounded, the end edge of the threaded bore of the mating nut does not bite into the external thread of the threaded guide part when the threaded guide part is inserted in the threaded bore of the nut and the position of the bolt is further corrected as the bolt is thrust into the threaded bore of the nut. Thus, the position of the bolt obliquely applied to the threaded bore of the nut relative to the nut is corrected as the bolt is thrust into the threaded bore of the nut and, eventually, the regularly threaded part of the bolt comes into correct engagement with the internal thread of the nut without being caught by the inner surface of the nut.

Since the external thread of the threaded guide part is the same in pitch and lead angle as the external thread of the regularly threaded part, the bolt can be smoothly screwed in the threaded bore of the nut when the bolt pressed against the nut is rotated.

Since the screw thread form of the external thread of the threaded guide part is smaller than and can be included in that of the external thread of the regularly threaded part, the rounded crests of the external thread of the threaded guide part do not exert any pressure on flanks of the internal thread of the mating nut and the crests of the external thread of the threaded guide part are able to come into smooth contact with the flanks of the internal thread of the mating nut.

Since the external thread of the threaded guide part may have at least two major diameters, the position of the bolt obliquely applied to the threaded bore of the mating nut can be gradually and smoothly corrected as the bolt is screwed into the mating nut.

When the external thread of the threaded guide part has a single major diameter, the bolt has a simple form and can be easily manufactured.

When the thread form of rounded crests of the external thread of the threaded guide part has a radius of curvature in the range of 20% to 60% of the pitch, the screw threads of the external thread of the threaded guide part are received in spaces between the adjacent screw threads of the internal thread of the mating nut without being obstructed by the receiving end of the threaded bore of the nut and the internal thread of the mating nut, so that the position of the bolt obliquely applied to the threaded bore of the mating nut can be easily and smoothly corrected. If the rounded crests of the external thread of the threaded guide part of the bolt has a radius of curvature smaller than 20% of the pitch, the bolt is obstructed by the receiving end of the threaded bore and the internal thread of the mating nut. If the rounded crests of the external thread of the threaded guide part of the bolt has a radius of curvature greater than 60% of the pitch, the oblique position of the bolt relative to the mating nut can not be smoothly corrected.

When the edge of the end surface of the cylindrical guide part is rounded in a radius of curvature equal to 50% of the pitch or above, movement of the cylindrical guide part of the bolt into the threaded bore of the mating nut will not be obstructed by the bearing end of the threaded bore of the mating nut and, consequently, the position of the bolt relative to the mating nut can be corrected as expected. If the radius of curvature of the rounded edge of the end surface of the cylindrical guide part is less than 50% of the pitch, it is highly possible that the cylindrical guide part of the bolt is caught by the bearing end of the threaded bore and the internal thread of the mating nut.

An object of a third aspect of the present invention is to solve the problems in the prior art and to provide a self-locking bolt capable of meeting various fastening conditions prevalent at present, of being used in combination with members of various materials, such as steels, magnesium and aluminum, and of exercising a satisfactory locking function.

To achieve the object of the third aspect of the present invention, the present invention provides a self-locking bolt having a head having a locking function, and a threaded part extending from the head and provided with ane external thread of a pitch P; wherein n locking projections are formed at equal angular intervals on the bearing surface of the head, the height of each locking projection from the bearing surface of the head increases gradually in a direction opposite a fastening direction in which the bolt is rotated for fastening to a maximum height, an edge is formed in a highest portion of the locking projection at the maximum height, and the maximum height of the edge of the locking projection from the bearing surface of the head is nearly equal to or less than P/n.

Since the locking projection is formed so that its height increases gradually in the direction opposite the fastening direction to the maximum height, the bolt can be fastened under a low resistance against the rotation of the bolt in the fastening direction. On the other hand, the height of the locking projection decreases sharply from the maximum height at the edge to the level of the bearing surface of the head of the bolt. The edges of the locking projections sink in the surface of a member fastened by the bolt to exercise the locking function of the locking projections when the bolt tends to turn in the direction opposite the fastening direction.

Since the height of the edge is nearly equal to and less than P/n, the locking projections can be surely made to sink in the surface of the member by turning the bolt by 1/n of a full turn. Since the height of the edges of the locking projections is as small as a value nearly equal to or less than P/n, the depth by which the locking projections are made to sink in the surface of the member is relatively small. The cumulative locking effect of the n locking projections takes a sufficient locking effect.

Another self-locking bolt according to the present invention has a head having a locking function and a threaded part extending from the head and provided with an external thread of a pitch P. N locking recesses are formed at equal angular intervals in the bearing surface of the head. The depth of each locking recess from the bearing surface of the head decreases gradually in a direction opposite a fastening direction in which the bolt is rotated for fastening to a minimum depth, and an edge is formed at the joint of an end wall of the locking recess at a position at the maximum depth and the bearing surface of the head.

When the self-locking bolt is used for fastening a lockable member i.e., of a soft material, such as magnesium or aluminum, the bearing surface of the head of the self-locking bolt comes into contact with and compresses the surface of the member as the self-locking bolt is turned so portions of the surface of the member of the soft material are caused to move so as to form small protrusions protruding into the locking features of the head. The self-locking bolt is locked in place by the combined effect of the small protrusions of the member and the edges formed in the bearing surface of the head.

DESCRIPTION OF THE PREFERRED EMBODIMENTS

The first aspect of the present invention will be described.

Figure 1:
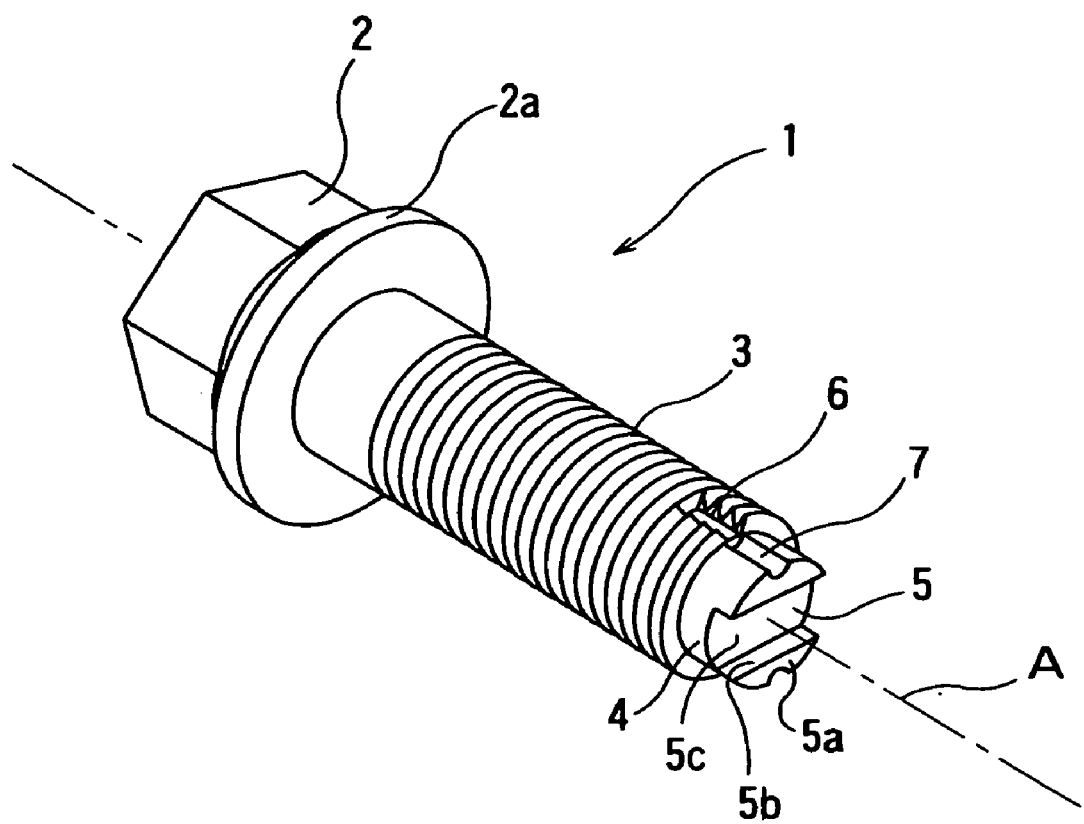
FIG. 1 is a perspective view of a bolt in a first embodiment according to the present invention.

A bolt in a first embodiment according to the present invention will be described with reference to the accompanying drawings. Referring to FIG. 1, a bolt 1 has a head 2 to which a fastening tool, not shown, is applied, a regularly threaded part 3 extending from the head 2 and capable of being regularly engaged with a mating internal thread, and a cylindrical guide part 4 extending from the extremity of the regularly threaded part 3. A washer 2a is formed integrally with the head 2. The cylindrical guide part 4 has a diameter slightly smaller than the minor diameter of the mating internal thread. Therefore, the cylindrical guide part 4 can be closely fitted in the mating internal thread. A slot 5 is formed in the end surface of the guide part 4.

The slot 5 is formed symmetrically with respect to the center of the end surface of the guide part 4 in a width smaller than the diameter of the guide part 4 by slotting an end portion of the guide part 4 in a depth parallel to the axis A of the bolt 1. Thus, formed in an end portion of the guide part 4 are end surfaces 5a, i.e., portions of the end surface of the guide part 4 remaining after forming the slot 5, axial surfaces 5b substantially parallel to the axis A of the bolt 1, i.e., the side surfaces of the slot 5, and a cross surface 5c, i.e., the bottom surface of the slot 5. Edges of substantially 900 are formed at the intersections of the end surfaces 5a and the axial surfaces 5b, at the intersections of the axial surface 5b and the cylindrical surface of the guide part 4, and at the intersections of the cross surface 5c and the cylindrical surface of the guide part 4. The slot 5 need not be formed necessarily by slotting a portion of the end of the guide part 4 in a depth parallel to the axis A of the bolt 1; a recess other than the slot 5 may be formed in the end of the guide part 4 provided that sharp edges are formed in the end of the guide part 4.

Two longitudinal grooves 7 having a trapezoidal cross section are formed at diametrically opposite positions in the circumference of the guide part 4. Sharp edges are formed at the intersections of the surface of the grooves 7 and the circumference of the guide part 4.

Longitudinal grooves 6 are formed across about 1.5 screw threads in a portion of the regularly threaded part 3 contiguous with the guide part 4.

The length of the longitudinal grooves 6 may be in the range of a thread length of one screw thread to a thread length of three screw threads. When the length of the longitudinal grooves 6 is greater than the thread length of three screw threads, the thread length of the complete screw threads in the regularly threaded part 3 is reduced excessively. When the length of the longitudinal grooves 6 is smaller than the thread length of one screw thread, the longitudinal grooves 6 are unable to form sharp edges. The longitudinal grooves 6 of the regularly threaded part 3 are aligned with the longitudinal grooves 7, respectively.

Figure 2:
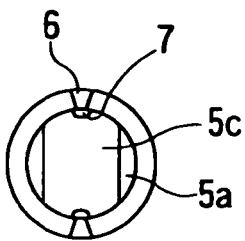
FIGS. 2(a), 2(b) and 2(c) are an end view, a side elevation and a plan view, respectively, of the bolt shown in FIG. 1.
Figure 2:
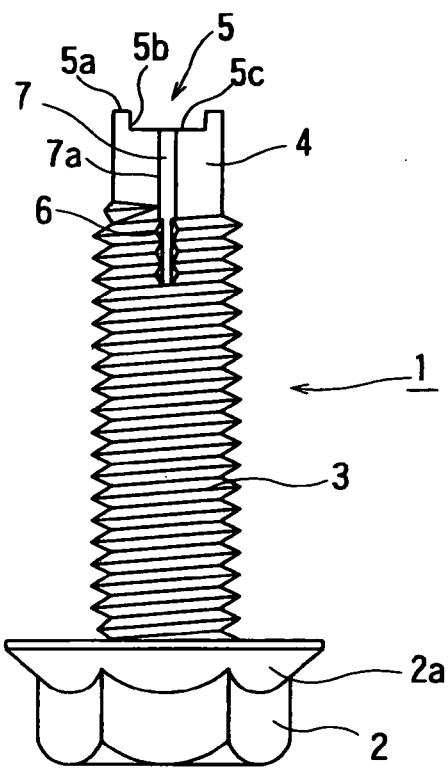
Figure 2:
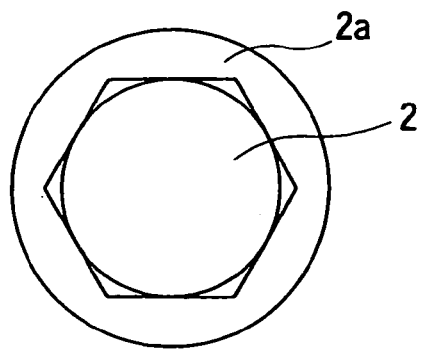
Figure 3:
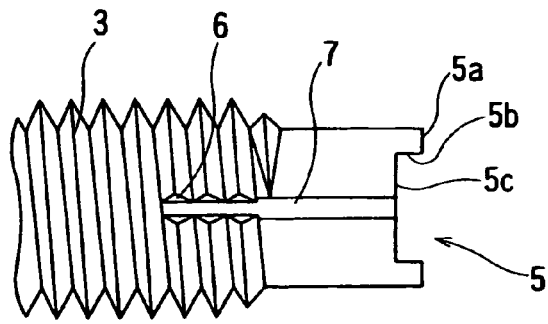
FIGS. 3(a) and 3(b) are an enlarged side elevation of a part shown in FIG. 2(b) and an enlarged end view of a part of FIG. 2(a), respectively.
Figure 3:
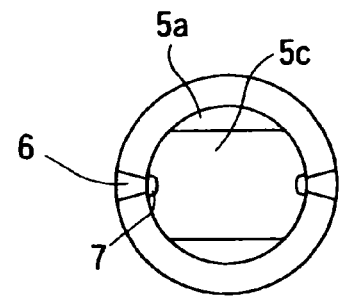
Figure 4:
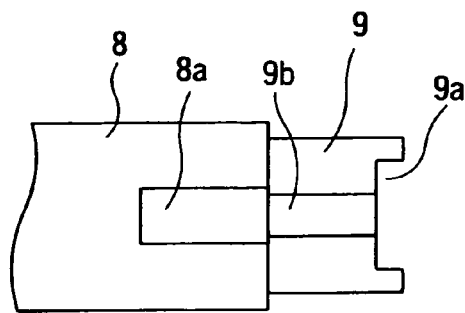
FIGS. 4(a) and 4(b) area side elevation and an end view, respectively, of a blank for forming an external thread formed in the bolt shown in FIG. 1 by form rolling.
Figure 4:
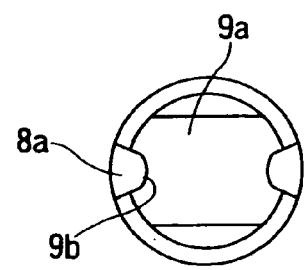

FIGS. 2(a), 2(b) and 2(c) are an end view, a side elevation and a plan view, respectively, of the bolt 1. FIGS. 3(a) and 3(b) are enlarged views of an end part of the bolt 1 shown in FIGS. 2(a) and 2(b). FIGS. 4(a) and 4(b) are views of a blank for forming the bolt 1 by form rolling. In FIGS. 4(a) and 4(b), a part indicated at 8 corresponds to the regularly threaded part 3, parts indicated at 8a correspond to the longitudinal grooves 6, a part indicated at 9 corresponds to the guide part 4, a part indicated at 9a corresponds to the slot 5 and parts indicated at 9b correspond to the longitudinal grooves 7.

The operation of the bolt 1 will be described hereinafter.

A nut provided with an internal thread mating with the external thread of the bolt 1 is welded beforehand to a plate. Suppose that metal particles sputtered during a welding process or paint particles scattered during a painting process are caused to stick to the internal thread of the nut.

The guide part 4 of the bolt 1 held and rotated by a fastening tool is inserted in the threaded bore of mating nut. Since the diameter of the cylindrical guide part 4 is slightly smaller than the minor diameter of the internal thread, a gap is formed scarcely between the guide part 4 and the threaded bore of the nut when the guide part 4 is inserted in the threaded bore of the nut. The metal particles or paint particles sticking to the surfaces of the screw threads of the internal thread can be scraped off the internal thread by the edges formed by forming the slot 5 in the end of the guide part 4 when the bolt 1 is rotated.

Since the sharp edges are formed at the intersections of the end surfaces 5a and the axial surfaces 5b, at the intersections of the axial surface 5b and the cylindrical surface of the guide part 4, and at the intersections of the cross surface 5c and the cylindrical surface of the guide part 4, the metal particles and the like sticking to the internal thread of the mating nut can be removed before the external thread of the regularly threaded part 3 is brought into engagement with the internal thread. Thus, the external thread of the regularly threaded part 3 of the bolt 1 can be easily engaged with the internal thread of the mating nut.

The sharp edges formed at the intersections of the longitudinal grooves 7 and the circumference of the guide part 4 also remove the metal particles and the like sticking to the threaded bore of the nut. Thus, the metal particles and the like sticking to the threaded bore of the nut can be surely removed.

Since the metal particles and the like sticking to the threaded bore of the mating nut are removed before the external thread of the regularly threaded part 3 of the bolt 1 comes into engagement of the internal thread of the mating nut, the regularly threaded part 3 can be smoothly screwed in the threaded bore of the mating nut. Metal particles and the like sticking to the roots and crests of the screw threads of the internal thread can be scraped off by sharp edges defined by the longitudinal grooves 6 formed in the regularly threaded part 3.

Bolts in modifications of the bolt 1 shown in FIG. 1 will be described hereinafter with reference to FIGS. 5 to 10.

Figure 5:
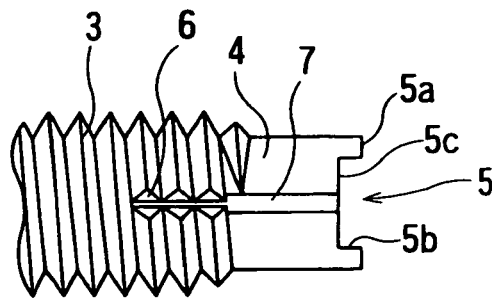
FIGS. 5(a) and 5(b) area side elevation and an end view, respectively, of bolt in a first modification of the bolt shown in FIG. 1.
Figure 5:
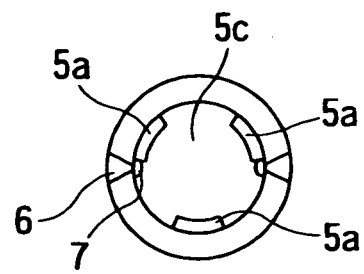

Referring to FIG. 5 showing a bolt in a first modification of the bolt 1 shown in FIG. 1, a recess 5 is formed in the end of a cylindrical guide part 4 leaving three lands respectively having end surfaces 5a and axial surfaces 5b. The recess 5 has a cross surface 5c perpendicular to the axis of the bolt and substantially parallel to the end surfaces 5a.

Figure 6:
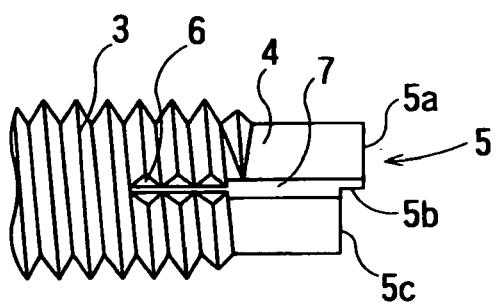
FIGS. 6(a) and 6(b) are a side elevation and an end view, respectively, of a bolt in a second modification of the bolt shown in FIG. 1.
Figure 6:
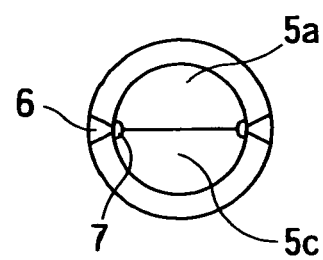

Referring to FIG. 6 showing a bolt in a second modification of the bolt 1 shown in FIG. 1, a recess 5 is formed in a half section of the end of a cylindrical guide part 4 leaving a land having an end surface 5a and an axial surface 5b. The recess 5 has a cross surface 5c perpendicular to the axis A of the bolt and substantially parallel to the end surfaces 5a.

Figure 7:
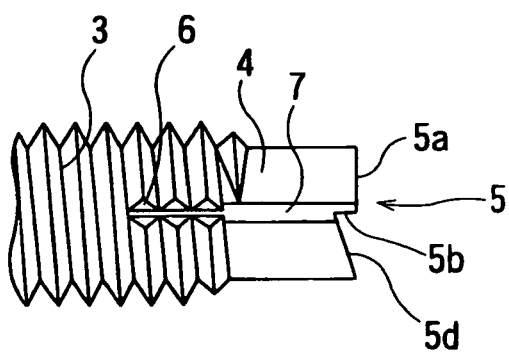
FIGS. 7(a) and 7(b) area side elevation and an end view, respectively, of a bolt in a third modification of the bolt shown in FIG. 1.
Figure 7:
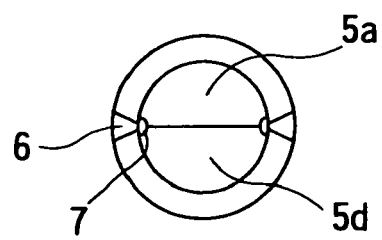

Referring to FIG. 7 showing a bolt in a third modification of the bolt 1 shown in FIG. 1, a recess 5 is formed in a half section of the end of a cylindrical guide part 4 leaving a land having an end surface 5a and an axial surface 5b. The recess 5 has an inclined cross surface 5c inclined to the axis A of the bolt.

Figure 8:
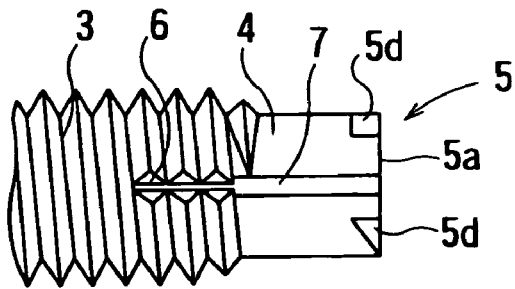
FIGS. 8(a) and 8(b) area side elevation and an end view, respectively, of a bolt in a fourth modification of the bolt shown in FIG. 1.
Figure 8:
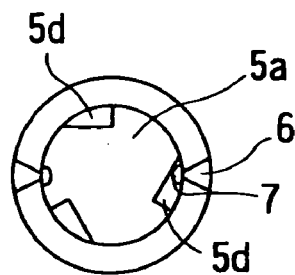

Referring to FIG. 8 showing a bolt in a fourth modification of the bolt 1 shown in FIG. 1, three recess 5 are formed in a peripheral region of the end of a cylindrical guide part 4 so as to leave a land having and end surface 5a. Each recess 5 has an axial surface 5b substantially parallel to the axis A of the bolt and an inclined cross surface 5c inclined to the axis A of the bolt.

Figure 9:
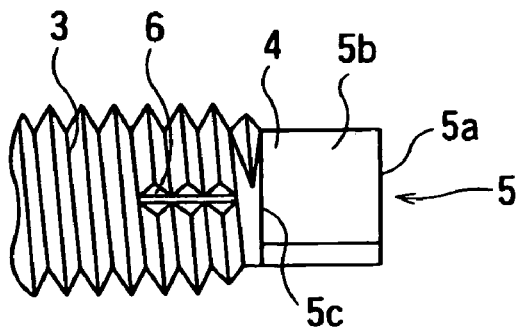
FIGS. 9(a) and 9(b) are a side elevation and an end view, respectively, of a bolt in a fifth modification of the bolt shown in FIG. 1.
Figure 9:
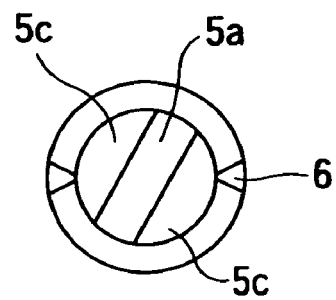

Referring to FIG. 9 showing a bolt in a fifth modification of the bolt 1 shown in FIG. 1, recesses 5 are formed in opposite side sections of the end of a cylindrical guide part 4 leaving a central land having an end surface 5a and axial surfaces 5b. The recesses 5 have cross surfaces 5c substantially parallel to the end surface 5a. The two cross surfaces 5c extend on the opposite sides of the end surface 5a, respectively.

Figure 10:
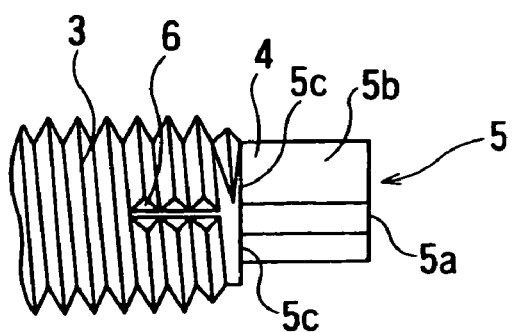
FIGS. 10(a) and 10(b) are a side elevation and an end view, respectively, of a bolt in a sixth modification of the bolt shown in FIG. 1.
Figure 10:
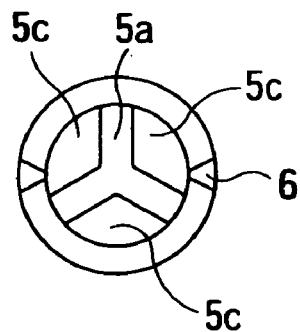

Referring to FIG. 10 showing a bolt in a sixth modification of the bolt 1 shown in FIG. 1, three recesses 5 are formed at angular intervals of 120° in peripheral regions of the end of a cylindrical guide part 4 leaving a tripodal land having an end surface 5a and axial surfaces 5b. The recesses 5 have cross surfaces 5c substantially parallel to the end surface 5a.

Each of the bolts shown in FIGS. 5 to 10, similarly to the bolt shown in FIG. 1, has sharp edges formed in the guide part 4. Therefore, metal particles and the like sticking to the threaded hole of a mating nut can be removed by the edges of the guide part 4 before a regularly threaded part 3 comes into engagement with the threaded bore of the mating nut, so that the regularly threaded part 3 can be easily screwed in the threaded bore of the mating nut.

A nut in a second embodiment according to the present invention will be described with reference to FIGS. 11 to 14.

A nut 21 has a hexagonal head 22 to be fitted in a fastening tool, and a washer 23 formed integrally with the hexagonal head 22. The nut 21 has a threaded bore 24 provided with an internal thread capable of being engaged with the external thread of a mating bolt.

The threaded bore 24 has a partly recessed threaded section 25 on the side of the washer 23, and a regularly threaded section 26 continuous with the partly recessed threaded section 25 and capable of being regularly engaged with the external thread of the mating bolt. The partly recessed threaded section 25 is provided with, for example, three recesses 27 arranged at angular intervals of, for example, 120°. The length of the recess 27 is equal to a length corresponding to at least one screw thread, for example, 1.5 screw threads of the internal thread of the threaded bore 24. Sharp edges are formed at the intersections of the recesses 27 and the screw threads of the internal thread of the threaded bore 24.

The sum of the circumferential widths of the three recesses 27 is not smaller than half the circumference of the regularly threaded section 26, i.e., half the circumference of the threaded bore 24. When the circumferential width of each recess 27 is very small or when the recesses 27 have a great circumferential width but the number of the recesses 27 is insufficient, the sum of the circumferential widths of the recesses 27 may possibly be smaller than half the circumference of the regularly threaded section 26. In such a case, only spaces of a volume insufficient to contain metal particles and the like removed from the external thread of the mating bolt temporarily are available and hence metal particles and the like cannot be effectively removed from the external thread of the mating bolt.

If the recesses 27 are formed in an excessively great radial depth, the mechanical strength of the nut will be reduced. If the recesses 27 are formed in an excessively small radial depth, the recesses 27 are unable to contain all the metal particles and the like removed from the external thread of the mating bolt and hence the regularly threaded part 4 cannot be smoothly engaged with the external thread of the mating bolt. Desirably, the radial depth of the recesses 27 is in the range of a value corresponding to the depth of the screw thread of the internal thread to a value corresponding to twice the depth of the screw thread of the internal thread. The depth is the distance between the crest and the root of the screw thread.

The recesses 27 may be formed so as to extend across one to two screw threads. When the recesses 27 are formed so as to extend across more than two screw threads, the number of the regular screw threads of the regularly threaded section 26 is reduced, which is disadvantageous. When the recesses 27 is formed so as to extend across less than one screw thread, the recesses 27 are unable to define sharp edges.

Figure 11:
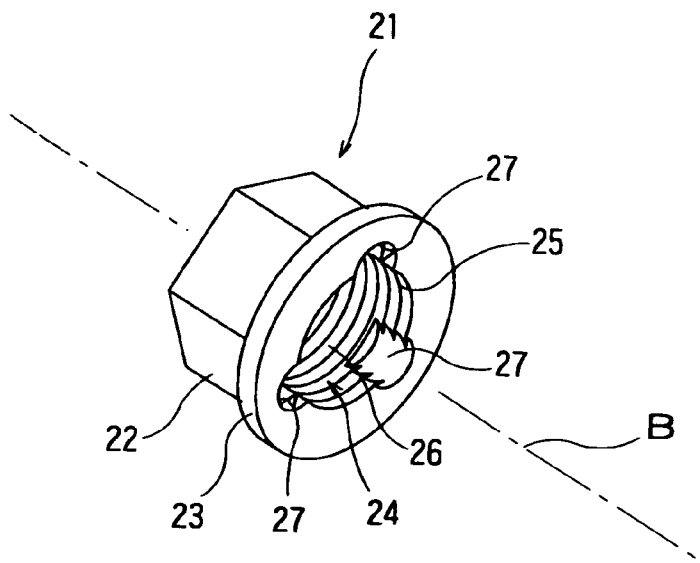
FIG. 11 is a perspective view of a nut in a second embodiment according to the present invention.
Figure 12:
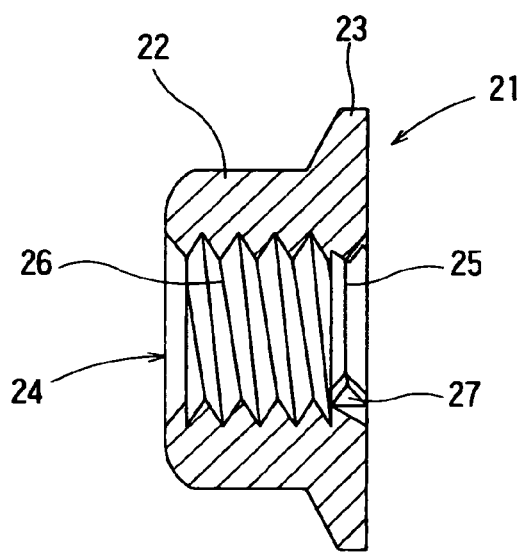
FIG. 12 is a longitudinal sectional view of the nut shown in FIG. 11.
Figure 13:
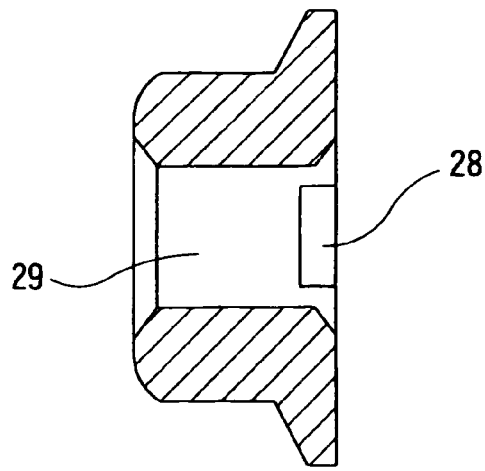
FIG. 13 is a longitudinal sectional view of a blank for forming the nut shown in FIG. 11 by form nut forming.
Figure 14:
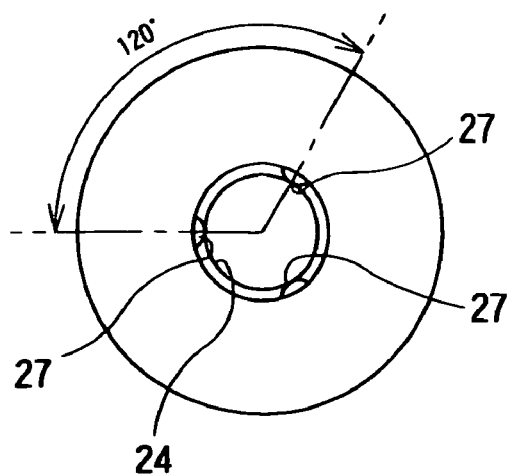
FIGS. 14(a), 14(b) and 14(c) are a bottom view, a side elevation and a top view, respectively, of the nut shown in FIG. 11.
Figure 14:
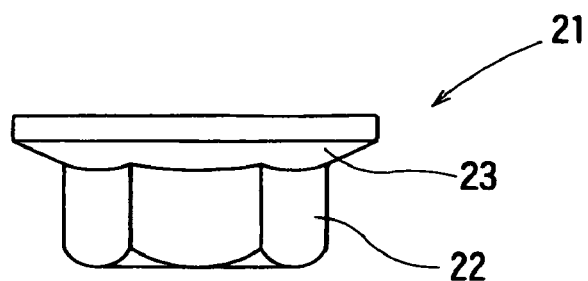
Figure 14:
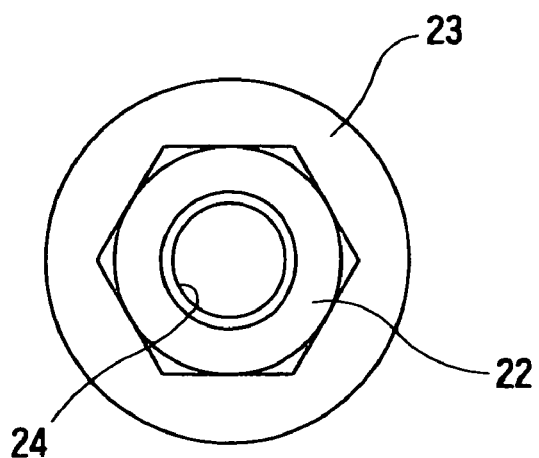

FIG. 12 is a longitudinal sectional view of the nut shown in FIG. 11 and FIG. 13 is a longitudinal sectional view of a blank for forming the nut shown in FIG. 11 by form nut forming. In FIG. 13, a part indicated at 28 corresponds to the partly recessed threaded section 25 and a part indicated at 29 corresponds to the regularly threaded section 26. FIGS. 14(a), 14(b) and 14(c) are a bottom view, a side elevation and a top view, respectively, of the nut 21 shown in FIG. 11.

The operation of the nut 21 will be described.

A bolt provided with an external thread mating with the internal thread of the nut 21 is welded beforehand to a plate. Suppose that metal particles sputtered during a welding process or paint particles scattered during a painting process are caused to stick to the external thread of the bolt.

The partly recessed threaded section 25 of the nut 21 held and rotated by a fastening tool is screwed on a threaded part of the bolt. The metal particles and the like sticking to the surfaces of the screw threads of the external thread can be scraped off the external thread by the sharp edges formed by forming the recesses 27 in the partly recessed threaded section 25 when the nut 21 is rotated. Thus, the metal particles and the like sticking to the external thread of the bolt can be removed before the regularly threaded section 26 is engaged with the external thread of the bolt. Therefore, the nut 21 can be easily screwed on the bolt without requiring an excessive force.

Since the partly recessed threaded section 25 is provided with the plurality of recesses 27 arranged at equal angular intervals, vibrations of the nut 21, which are generated when the nut 21 provided with the recesses 27 arranged at irregular angular intervals or with a single recess 27 is rotated by the fastening tool, can be prevented, the efficiency of work can be enhanced and noise can be reduced.

Although the nut 21 is provided with the plurality of recesses 27 of the same shape, the recesses need not necessarily be of the same shape provided that the recesses are arranged at equal angular intervals.

As is apparent from the foregoing description, according to the first aspect of the present invention, the bolt is capable of removing metal particles and the like sticking to the internal thread of the mating nut before the regularly threaded part thereof comes into engagement with the internal thread of the mating nut, and the nut is capable of removing metal particles and the like sticking to the external thread of the mating bolt before the regularly threaded section thereof comes into engagement with the external thread of the mating bolt. Thus, the bolt can be smoothly screwed in the mating nut, and the nut can be smoothly screwed on the mating bolt.

Since the guide part of the bolt is provided with the slot formed in the end thereof by cutting out a portion of the end part, metal particles and the like adhering to the internal thread of the mating nut can be removed before the regularly threaded part continuous with the guide part comes into engagement with the internal thread of the nut, so that the regularly threaded part can be easily engaged with the internal thread of the nut.

Since the nut has the partly recessed section formed on the base end side of thereof and provided with the recesses of an axial length corresponding to the thread length of at least one screw thread arranged at equal angular intervals, and the regularly threaded section that engages regularly with the external thread of the mating bolt, metal particles and the like adhering to the external thread of the mating bolt can be removed before the regularly threaded section comes into engagement with the external thread of the mating bolt. Therefore, the nut can be easily screwed on the mating bolt without requiring an excessive force.

A second aspect of the present invention will be described hereinafter.

A bolt of nominal size M8 (JIS) provided with an external thread of 1.25 in pitch will be described as a first embodiment according to the second aspect of the present invention.

Figure 15:
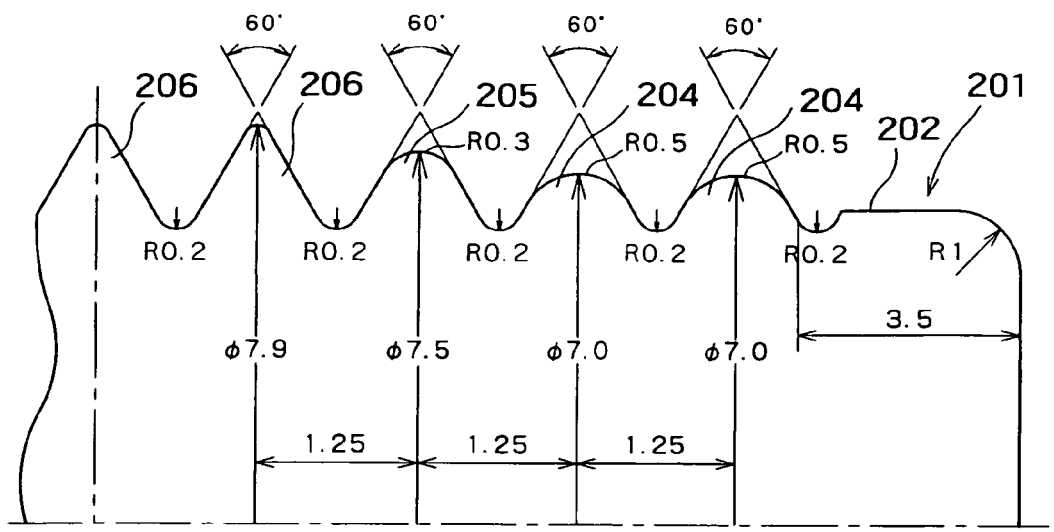
FIG. 15 is a fragmentally half longitudinal sectional view of a bolt in a first embodiment according to a second aspect of the present invention.
Figure 16:
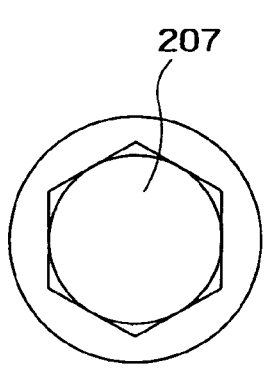
FIGS. 16(a) and 16(b) are a plan view and a side elevation, respectively, of the bolt shown in FIG. 15.
Figure 16:
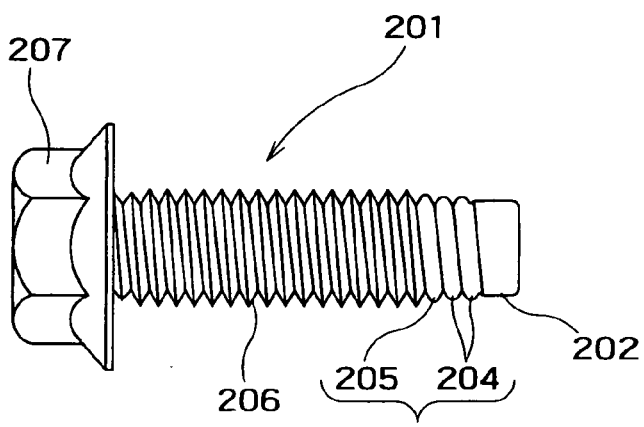
Figure 17:
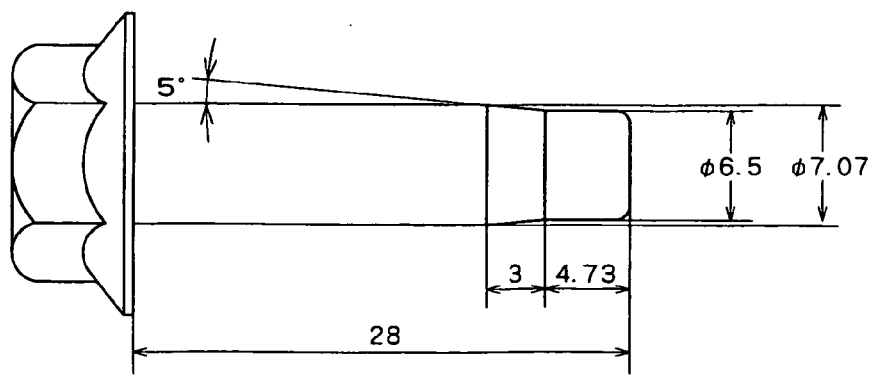
FIG. 17 is a side elevation of a blank for forming the bolt shown in FIG. 15 by form rolling.

FIGS. 15 to 17 show a bolt 201 of nominal size M8 in a first embodiment according to the second aspect of the present invention. The bolt 201 has a head 207, a regularly threaded part 206 to be regularly engaged with the internal thread of a mating nut, a threaded guide part 203 continuous with the regularly threaded part 206, and a cylindrical guide part 202 of 6.5 mm in diameter slightly smaller than the minor diameter of the internal thread of the mating nut.

The regularly threaded part 6 is provided with an external thread of nominal size M8 having a pitch of 1.25 mm and a major diameter of about 7.9 mm.

The threaded guide part 203 is provided with an external thread having screw threads having rounded crests. The major diameter of the external thread of the threaded guide part 203 is greater than the diameter of 6.5 mm of the cylindrical guide part 202 and smaller than the major diameter of 7.9 mm of the external thread of the regularly threaded part 206. Preferably, the external thread of the threaded guide part 203 is the same in pitch and lead angle as the external thread of the regularly threaded part 206. However, the external thread of the threaded guide part 202 need not necessarily be the same in dimensions as that of the regularly threaded part 206. The respective external threads of the threaded guide part 3 and the regularly threaded part 206 are the same in minor diameter.

The threaded guide part 203 has a first threaded guide section 204 including two screw threads and contiguous with the cylindrical guide part 202, and a second threaded guide section 205 including one screw thread and contiguous with the regularly threaded part 206. The major diameter of the external thread of the first threaded guide section 204 is 7 mm, and the major diameter of the external thread of the second threaded guide section 205 is 7.5 mm, which is greater than that of the first threaded guide section 204. The radius of curvature of the rounded crests of the screw threads of the first threaded guide section 204 is in the range of 20% to 60% of the pitch of 1.25 mm, for example, 0.5 mm. The radius of curvature of the rounded crest of the screw thread of the second threaded guide section 205 is in the range of 20% to 60% of the pitch of 1.25 mm, for example, 0.3 mm.

The external thread of the threaded guide part 203 has a screw thread form that can be included in that of the external thread of the regularly threaded part 206 when the former is superposed on the latter. Therefore, the rounded crests of the screw threads of the threaded guide part 203 do not exert any pressure on the flanks of the internal thread of a mating nut and are able to come into smooth contact with the flanks of the internal thread of the mating nut. The flanks of the screw threads of the external thread of the threaded guide part 203 may be either straight or curved in a circular arc. As shown in FIG. 15, the roots of the external thread of the threaded guide part 203 or the regularly threaded part 206 are rounded in a radius of curvature of 0.2 mm or below.

The edge of the end surface of the cylindrical guide part 202 is rounded in a radius of curvature of 50% of the pitch of 1.25 mm or above, for example, 1 mm. Although dependent on the length of the bolt, the axial length of the cylindrical guide part 202 is in the range of 2 to 5 mm, for example, 3.5 mm including the root of the external thread. If the radius of curvature of the rounded edge of the end surface of the cylindrical guide part 202 is less than 50% of the pitch of 1.25 mm, the position of the bolt can not be smoothly corrected when the bolt is applied obliquely to the threaded bore of the mating nut. The upper limit of the radius of curvature of the rounded edge of the end surface of the cylindrical guide part 202 may be determined according to the diameter and the axial length of the cylindrical guide part 202 so that the position of the cylindrical guide part 202 relative to the axis of the threaded bore of the mating nut can be smoothly corrected.

FIG. 17 is a side elevation of a blank for forming the bolt shown in FIG. 16 by form rolling.

The operation of the bolt 201 in this embodiment will be described hereinafter.

Since the cylindrical guide part 202 of the bolt 201 has a diameter smaller than the minor diameter of the internal thread of the mating nut and the edge of the end surface of the cylindrical guide part 202 is rounded in a radius of curvature of 1 mm, the cylindrical guide part 202 does not bite into and is not caught by the internal thread of the nut when the cylindrical guide part 202 of the bolt 201 is applied obliquely to the threaded hole of the mating nut and the position of the bolt relative to the nut is corrected as the bolt 201 is thrust onto the threaded hole of the nut in an early stage of screwing the bolt in the nut and the bolt 201 can be smoothly screwed into the mating nut.

When a pressure is applied to the head 207 of the bolt 201 to apply the threaded guide part 203 to the threaded hole of the mating nut, first the first threaded guide section 204 is applied to the entrance of the threaded bore of the mating nut. Since the crests of the external thread of the first threaded guide section 204 are rounded in a radius of curvature of 0.5 mm, the external thread of the first threaded guide section 204 does not bite into the internal thread of the mating nut, and the position of the bolt is further corrected as the bolt is rotated and thrust into the threaded bore of the nut.

Since the crest of the external thread of the second threaded guide section 205 having a major diameter greater than that of the external thread of the first threaded guide section 204 is rounded in a radius of curvature of 0.3 mm, the second threaded guide section 205 does not bite into the internal thread of the threaded bore and the position of the bolt 201 is corrected further as a pressure is applied to the head 207 of the bolt 201 and the bolt 201 is rotated for fastening.

Since the external threads of the threaded guide part 203 are the same in pitch and lead angle as the external thread of the regularly threaded part 206, the flanks of the screw threads of the external threads of the threaded guide part 203 come into partial or total contact with those of the screw threads of the internal thread of the mating nut when a pressure is applied to the head 207 of the bolt 201 and the bolt 201 is rotated. Thus, the bolt 201 can be smoothly rotated and can be properly screwed into the mating nut.

When the angular position of the bolt 201 applied obliquely to the threaded bore of the mating nut relative to the axis of the mating nut is corrected by inserting the cylindrical guide part 202 in the threaded bore of the nut, the threaded guide part 203 of a diameter greater than that of the cylindrical guide part 202 can be smoothly inserted in the threaded bore of the mating nut.

The threaded guide part 203 has the first threaded guide section 204 contiguous with the cylindrical guide part 202, and the second threaded guide section 205 continuous with the first threaded guide section 204 and contiguous with the regularly threaded part 206, the major diameter of the external thread of the second threaded guide section 205 is greater than that of the external thread of the first threaded guide section 204 and the major diameter of the external thread of the regularly threaded part 206 is greater than that of the second threaded guide section 205. Therefore, the first threaded guide section 204, the second threaded guide section 205 and the regularly threaded part 206 come into engagement with the internal thread of the mating nut in that order.

The radius of curvature of the rounded crests of the external thread of the regularly threaded part 206 is smaller than that of the external thread of the second threaded guide section 205, and the radius of curvature of the rounded crests of the external thread of the external thread of the second threaded guide section 205 is smaller than that of the external thread of the first threaded guide section 204. Therefore, the closeness of engagement of the bolt 201 and the mating nut increases as the bolt 201 is screwed into the threaded bore of the mating nut.

Figure 18:
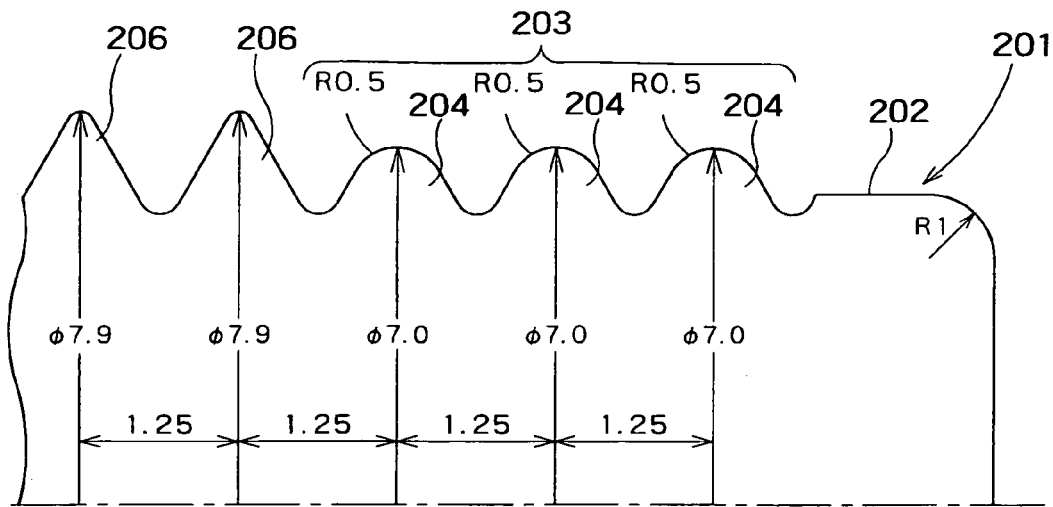
FIG. 18 is a fragmentally half longitudinal sectional view of a bolt in a modification of the bolt shown in FIG. 15.
Figure 19:
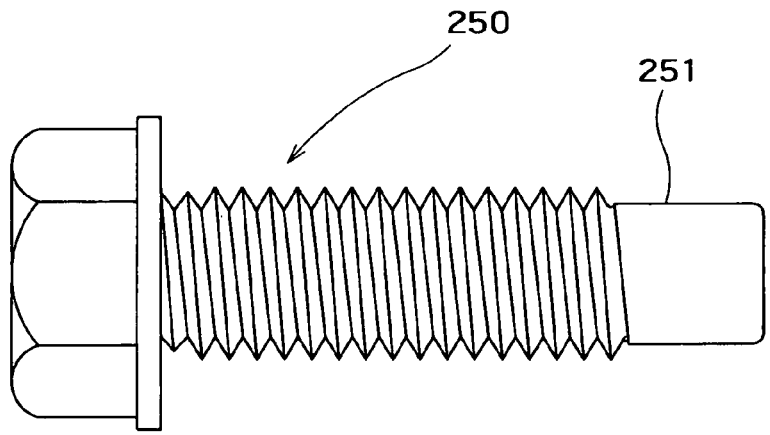
FIG. 19 is a side elevation of a conventional bolt.
Figure 20:
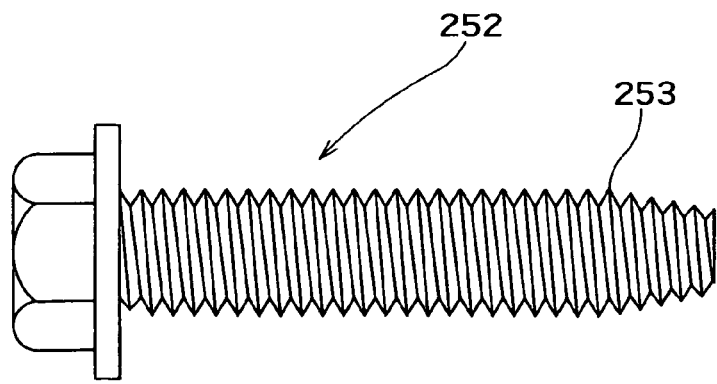
FIG. 20 is a side elevation of another conventional bolt.

FIG. 18 shows a bolt in a modification of the bolt shown in FIG. 15 or 16. Referring to FIG. 18, a threaded guide part 203 has a single threaded guide section 204 having an external thread having three screw threads of the same major diameter. The bolt is simple in construction. and can be easily manufactured.

As is apparent from the foregoing description, according to the second aspect of the present invention, even if a fastening tool is pressed against the head of the bolt 201 to apply the bolt 201 to the mating nut obliquely with respect to the axis of the mating nut, the angular position of the bolt 201 relative to the axis of the mating nut can be gradually corrected as the bolt 201 advances into the threaded bore of the mating nut, the galling and seizing of the screw threads can be avoided, the bolt 201 and the mating nut can be smoothly engaged, fastening work can be efficiently achieved and assembling cost can be reduced.

Although the threaded guide part 203 of the foregoing bolts 201 has the one threaded guide section or the two threaded guide sections provided with external threads of different major diameters, respectively, the threaded guide part 203 may have three or more threaded guide sections provided with external threads of different major diameters, respectively.

According to the second aspect of the present invention, the angular position of the bolt relative to the axis of the mating nut is corrected gradually as the bolt is screwed into the threaded bore of the mating nut and, eventually, the angular position of the bolt is corrected so that the regularly threaded part of the bolt engages regularly with the threaded bore of the mating nut. Accordingly, high-speed fastening is possible, fastening work can be efficiently achieved and the assembling cost can be reduced.

A third aspect of the present invention will be described hereinafter.

Bolts in a third aspect of the present invention will be described with reference to the accompanying drawings.

Figure 21:
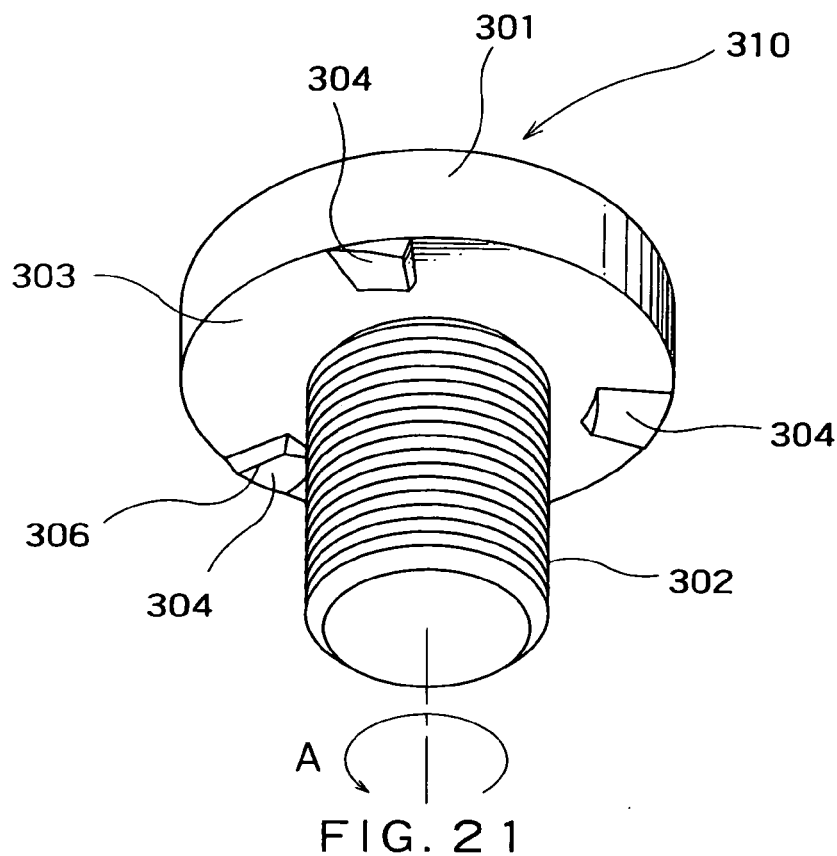
FIG. 21 is a perspective view of a self-locking bolt in a first embodiment according to a third aspect of the present invention.

A self-locking bolt 310 in a first embodiment according to the third aspect of the present invention shown in FIG. 21 is, for example, a small-size bolt of nominal size of 1.7 mm. Although small-size bolts are, typically, those of nominal size in the range of 1 to 3 mm, small-size bolts may include bolts of nominal size of 6 mm. The self-locking bolt 310 has a cross-recessed head 301 and a threaded part 302 extending from the cross-recessed head 301 and provided with an external thread of a pitch P. Formed in a peripheral region of the bearing surface 303 of the head 301 are n locking projections 304 arranged at equal angular intervals. For example, three locking projections 304 are formed on the bearing surface 303 of the head 301 at equal angular intervals.

Each locking projection 304 has the shape of a wedge tapering in the fastening direction A of the bolt 310. The height of each locking projection 304 increases in a direction opposite the fastening direction A to a maximum height so as to form an inclined surface and decreases suddenly to the level of the bearing surface 303 from the maximum height so as to form an axial surface. A sharp edge 306 is formed at the intersection of the inclined surface and the axial surface. The locking projections 304 are formed in a peripheral region of the bearing surface 303 and are separated from the threaded part 302.

Figure 29:
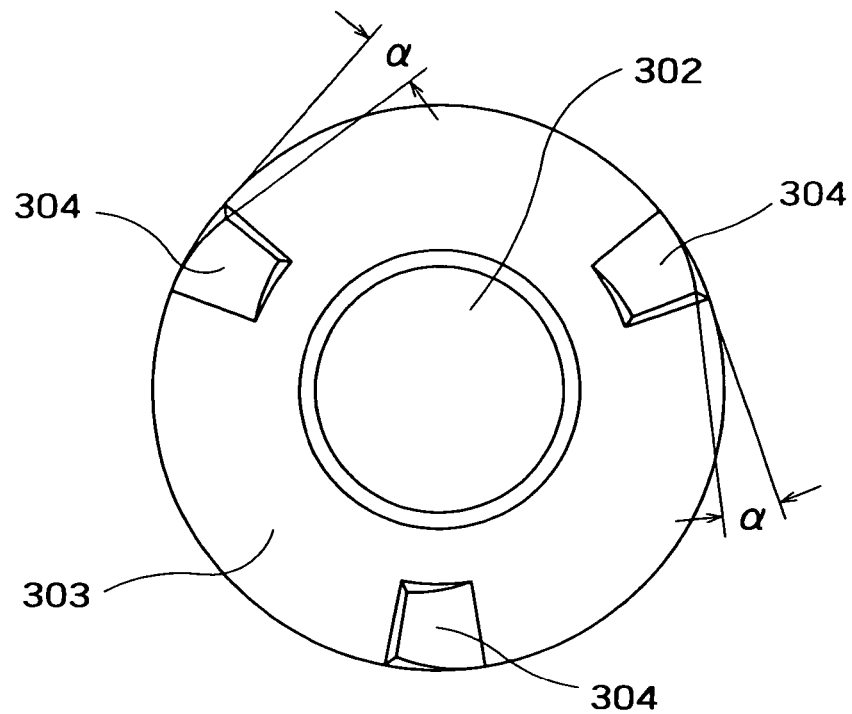
FIG. 29 is a plan view of the self-locking bolt shown in FIG. 21.

As shown in FIG. 29, the width of the inclined surface of the locking projection 304 decreases with the increase of the height. Although dependent on the size of the bolt, an angle α in FIG. 29 is in the range of about 6° to about 12°. FIG. 29 also shows that the total area of the planar portions PP is larger than the total planar projected area (the sum of shaded areas PA) of the locking projections 304.

Figure 30:
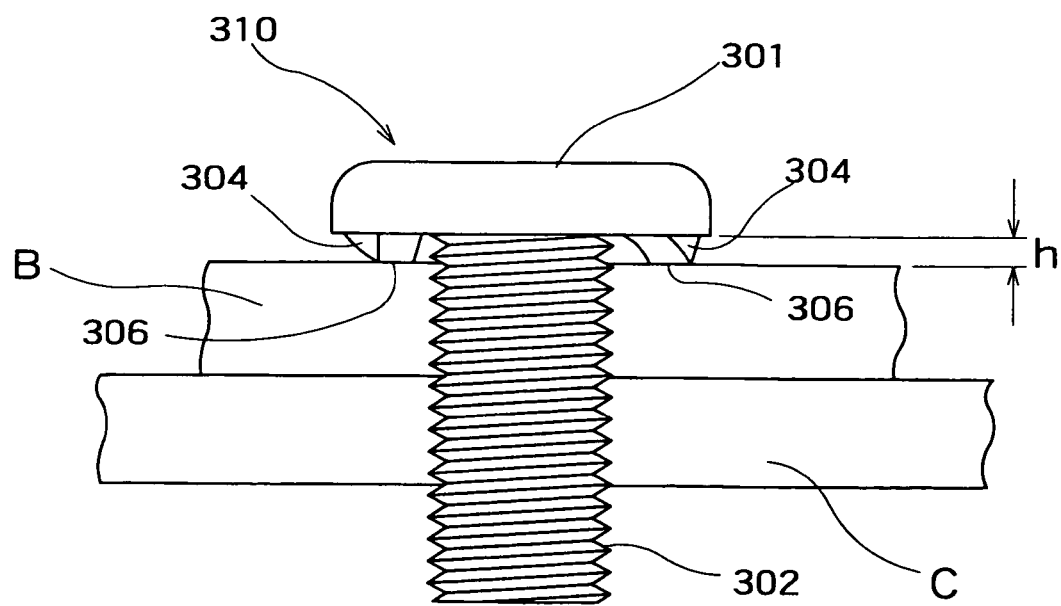
FIG. 30 is a side elevation of assistance in explaining an act of fastening two plates together with a self-locking bolt according to the present invention.

FIGS. 21, 29 and 30 show two plates B and C fastened together with the self-locking bolt 310 to show that the bolt is, by definition as well as appearance, a machine screw. The plate B is provided with a through hole of a diameter greater than the major diameter of the external thread of the self-locking bolt 310 and the plate C is provided with threaded hole having an internal thread formed by tapping and mating with the external thread of the self-locking bolt 310. The bolt is passed through the hole of the plate B and is screwed in the threaded hole of the plate C to fasten the plates B and C together. In the state shown in FIG. 30, the edges 306 of the number n=3 of locking projections 304 formed on the bearing surface 303 are in contact with the upper surface of the plate B. The maximum height h of the edges 306 is nearly equal to or smaller than ⅓ of a the pitch P distance by which the self-locking bolt 310 advances when the same is turned by one full turn in the fastening direction, i.e., P/3. As the self-locking bolt 310 is turned further in the fastening direction form the state shown in FIG. 30, the edges 306 of the locking projections 304 sink gradually in the upper surface of the plate B. The self-locking bolt 310 is turned further until fastening torque applied to the self-locking bolt 310 increases to a predetermined value after the locking projections 304 have completely sunken into the upper surface of the plate B and the bearing surface 303 has come into contact with the upper surface of the plate B.

Since the height of the locking projections 304 increases gradually in a direction opposite the fastening direction A to the maximum height, the self-locking bolt 310 can be further turned from the state shown in FIG. 30 making the locking projections 304 sink in the upper surface of the plate B under a relatively low resistance against the rotation of the self-locking bolt 310 in the fastening direction.

On the other hand, the height of the locking projection decreases sharply from the maximum height to the level of the bearing surface 303 to form the edge 306 at the maximum height. Therefore, the edges 306 of the locking projections 304 sink in the upper surface of the plate B to exercise the locking function of the locking projections 304 when the self-locking bolt 310 tends to turn in the direction opposite the fastening direction A.

Since the height of the edge 306 is nearly equal to and less than P/3, the locking projections 304 can be surely made to sink into the upper surface of the plate B and the bearing surface 303 can be brought into contact with the upper surface of the plate B before the self-locking bolt 310 is turned by ⅓ of one full turn. Since the height of the edges 306 of the locking projections 304 is as small as a value nearly equal to or less than P/3, locking projections 304 can be made to sink into the upper surface of the plate B by a depth sufficient for the locking projections 304 to exercise their locking function. Thus, the plates B and C can be firmly fastened together with the self-locking bolt 310. The locking projections 304 made to sink fully in the upper surface of the plate B exercise their locking function with reliability.

Since the height of the edges 306 is as small as a value nearly equal to and less than P/3, the locking projections 304 sink in the upper surface of the plate B by a relatively small depth. The cumulative locking effect of the three locking projections 304 takes a sufficient locking effect even through the depth by which the locking projections 304 sink in the upper surface of the plate B is relatively small.

The plates B and C can be fastened together by turning the self-locking bolt 310 against a relatively low resistance from the state shown in FIG. 30, the depth of the locking projections 304 in the upper surface of the plate B is relatively small, and the cumulative locking effect of the three locking projections 304 takes a sufficient locking effect. Thus the self-locking bolt 310 is capable of fully exercising its locking effect when used for fastening members of various materials including hard steel and soft aluminum.

Self-locking bolts in modifications of the self-locking bolt shown in FIG. 21 will be described hereinafter.

Figure 22:
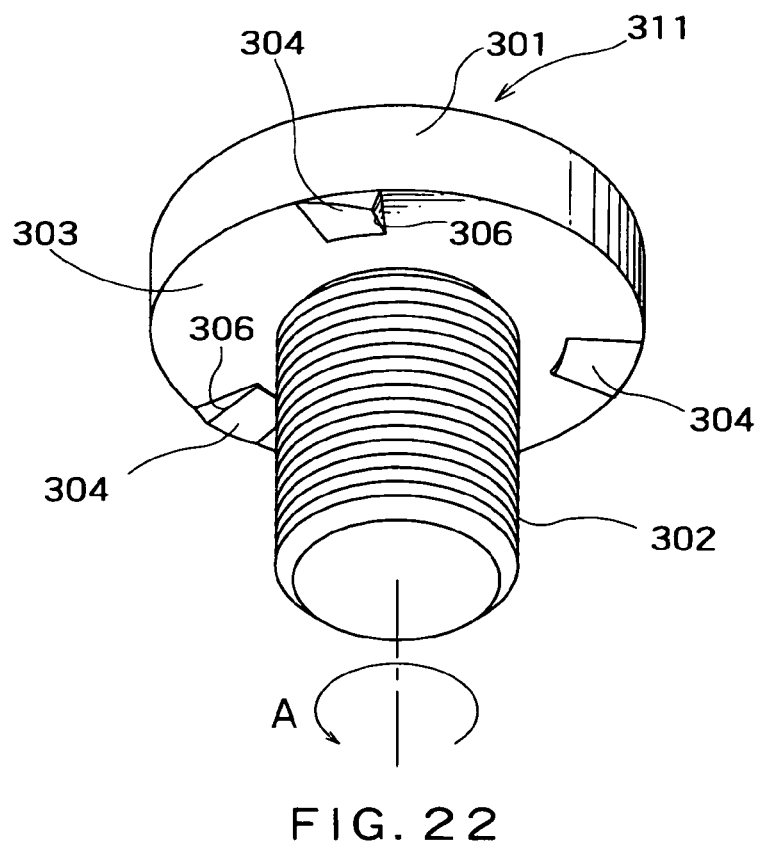
FIG. 22 is a perspective view of a self-locking bolt in a first modification of the self-locking bolt shown in FIG. 21.

A self-locking bolt 311 shown in FIG. 22 is similar to the self-locking bolt 310 in that locking projections 304 are formed in a peripheral region of the bearing surface 303 of a head 301 and are separated from a threaded part 302. The locking projections 304 of the self-locking bolt 311 are different from those of the self-locking bolt 310. The height of each locking projection 304 of the self-locking bolt 311 increases gradually in a direction opposite a fastening direction A and toward the circumference of the bearing surface 303 of a head 301 to a maximum height. Therefore an edge 306 formed in each locking projection 304 has a height decreasing from the radially outer end thereof toward the radially inner end thereof, and hence a sharp pyramidal point is formed at the radially outer end of the edge 306. Thus, the locking projections 304 are able to sink easily in the surface of a member to be fastened with the self-locking bolt 311 and the locking projections 304 exercise their locking function effectively.

Figure 23:
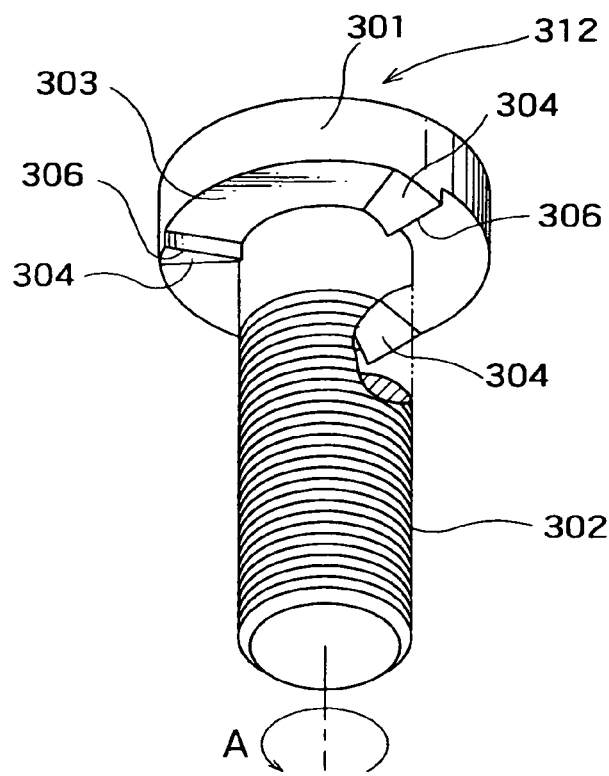
FIG. 23 is a perspective view of a self-locking bolt in a second modification of the self-locking bolt shown in FIG. 21.

A self-locking bolt 312 shown in FIG. 23 differs from the self-locking bolt 310 in that locking projections 304 are formed so as to extend from a peripheral region of the bearing surface 303 of a head 301 to a threaded part 302. Since the locking projections 304 of the self-locking bolt 312 have long radial edges 306, respectively, the locking effect of the self-locking bolt 312 is very high. The form of self-locking bolt 312 is effective when applied to bolts of small nominal size in which the edge 306 can be formed in a limited radial length.

Figure 24:
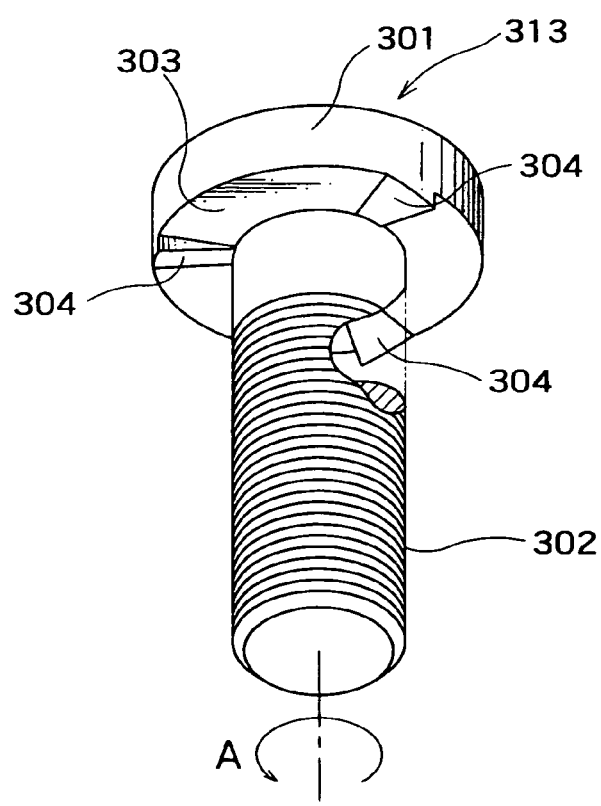
FIG. 24 is a perspective view of a self-locking bolt in a third modification of the self-locking bolt shown in FIG. 21.

A self-locking bolt 313 shown in FIG. 24 is provided with locking projections 304 formed so as to extend from a peripheral region of the bearing surface 303 of a head 301 to a threaded part 302. The height of each locking projection 304 of the self-locking bolt 313 increases gradually in a direction opposite a fastening direction A and toward the circumference of the bearing surface 303 of a head 301 to a maximum height. Therefore a sharp pyramidal point is formed at the radially outer end of the edge 306 of each locking projection 304. Thus, the locking projections 304 are able to sink easily in the surface of a member to be fastened with the self-locking bolt 313 and the edge 306 has a long radial length. Thus, the locking projections 304 exercise their locking function effectively.

A second embodiment of the third aspect of the present invention will be described with reference to FIGS. 25 to 28.

Figure 25:
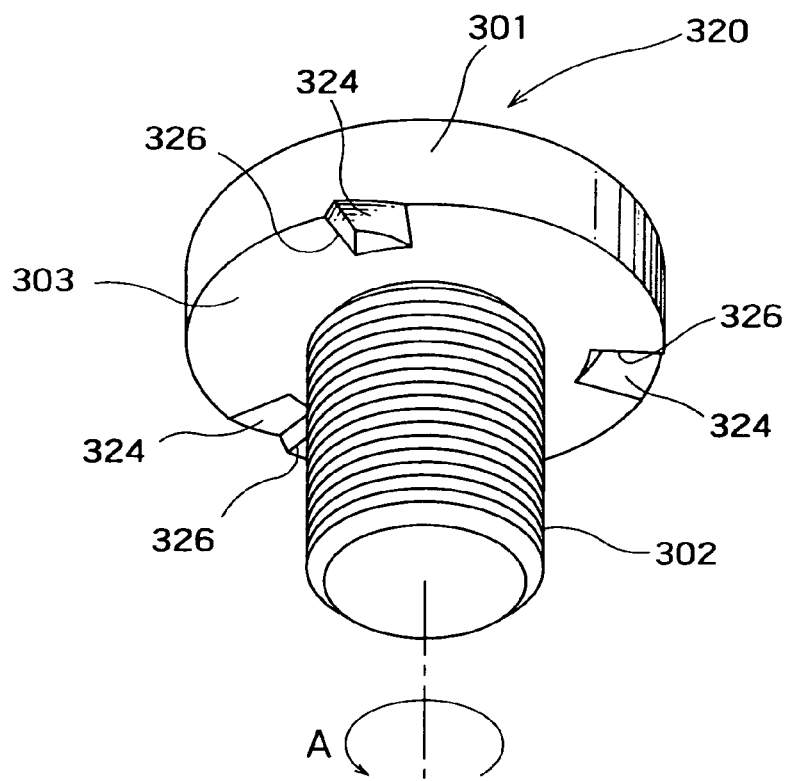
FIG. 25 is a perspective view of a self-locking bolt in a second embodiment according to the third aspect of the present invention.

A self-locking bolt 320 in a second embodiment according to the third aspect of the present invention shown in FIG. 25 is, for example, a small-size bolt of nominal size of 1.7 mm. Referring to FIG. 25, formed in a peripheral region of the bearing surface 303 of a head 301 are n locking recesses 324, for example, three locking recesses 324, arranged at equal angular intervals.

Each locking recess 324 has a depth gradually decreasing in a direction opposite a fastening direction A in which the self-locking bolt 320 is turned for fastening. An edge 306 is formed at the intersection of the bearing surface 303 and an axial surface of the locking recess 324.

The self-locking bolt 320 is used effectively for fastening a member of a soft material, such as magnesium or aluminum. When the self-locking bolt 320 is used for fastening a plate B of a soft material to a plate C as shown in FIG. 30, the bearing surface 303 comes into contact with the upper surface of the plate B in an early stage of fastening and, as the self-locking bolt 320 is turned further, the plate B of a soft material is compressed by the bearing surface 303. In a state where the plates B and C are fastened together with the self-locking bolt 320 in a predetermined condition, the bearing surface 303 compresses the plate B by a high pressure. Consequently, portions of the surface of the plate B are forced to bulge slightly into the locking recesses 324 in small protrusions. The small protrusions are caught by the edges 326 of the locking recesses 324, so that the self-locking bolt 320 is locked in place.

Self-locking bolts in modifications of the self-locking bolt 320 shown in FIG. 25 will be described hereinafter.

Figure 26:
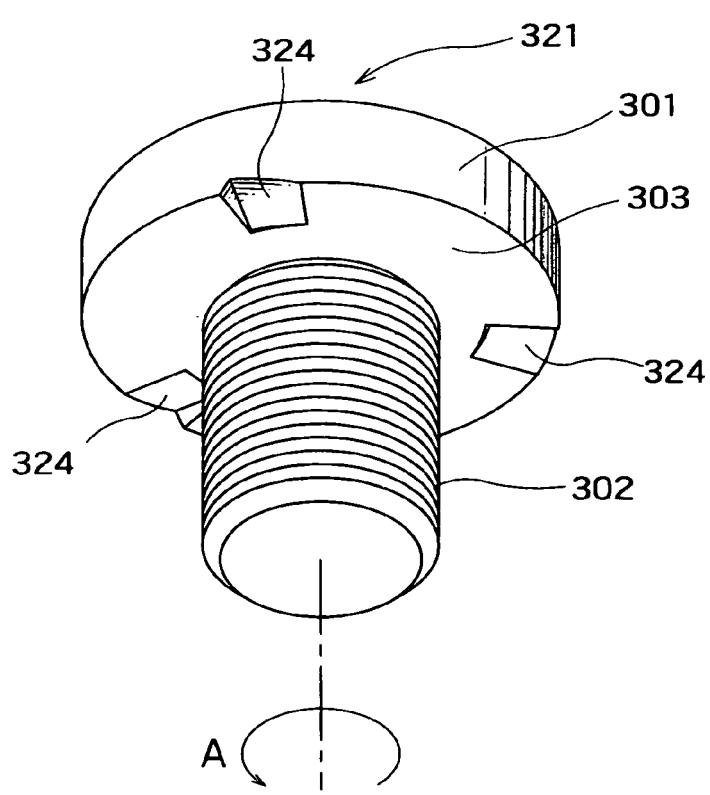
FIG. 26 is a perspective view of a self-locking bolt in a first modification of the self-locking bolt shown in FIG. 25.

A self-locking bolt 321 shown in FIG. 26 is similar to the self-locking bolt 320 in that locking recesses 324 are formed in a peripheral region of the bearing surface 303 of a head 301 and are separated from a threaded part 302. The locking recesses 324 of the self-locking bolt 321 are different from those of the self-locking bolt 320. The depth of each locking recess 324 of the self-locking bolt 321 decreases gradually in a direction opposite a fastening direction A and radially inward.

Figure 27:
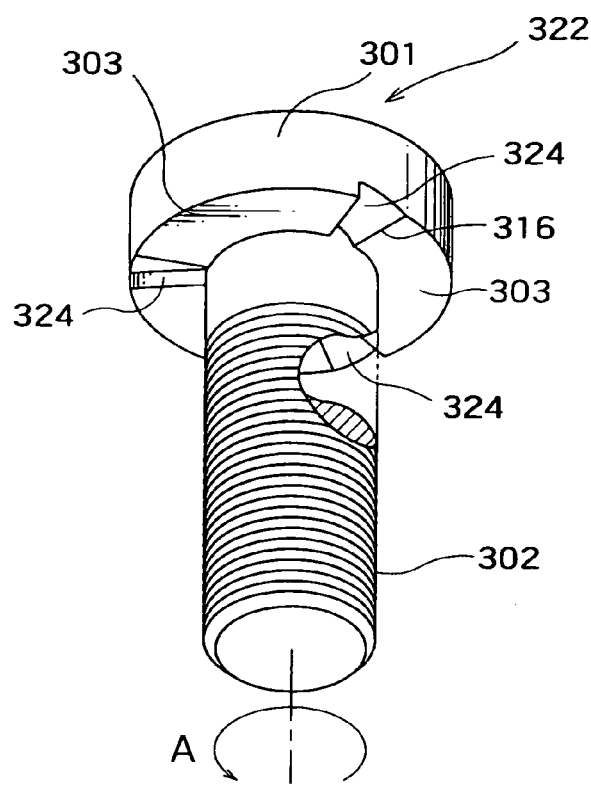
FIG. 27 is a perspective view of a self-locking bolt in a second modification of the self-locking bolt shown in FIG. 25.

A self-locking bolt 322 shown in FIG. 27 differs from the self-locking bolt 320 in that locking recess 324 are formed so as to extend from a peripheral region of the bearing surface 303 of a head 301 to a threaded part 302. Since the locking recesses 324 of the self-locking bolt 322 have long radial edges 306, respectively, the locking effect of the self-locking bolt 322 is very high. The form of self-locking bolt 322 is effective when applied to bolts of small nominal size in which the edge 306 can be formed in a limited radial length.

Figure 28:
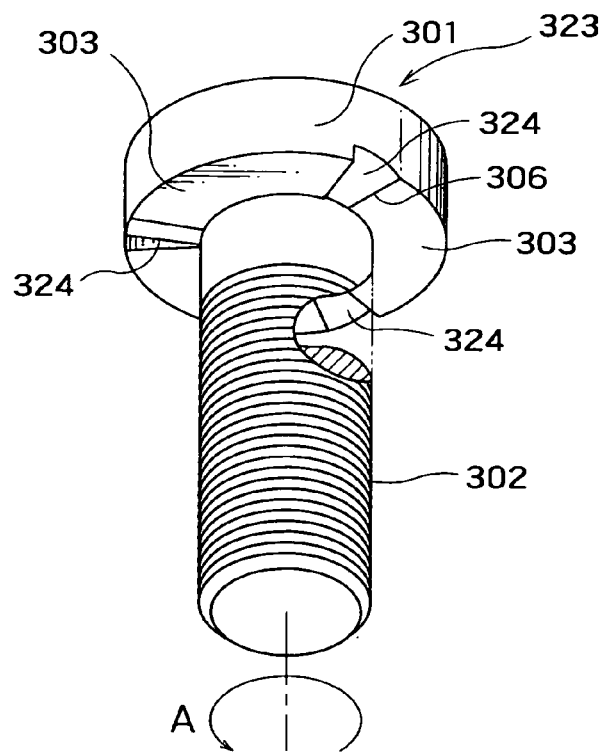
FIG. 28 is a perspective view of a self-locking bolt in a third modification of the self-locking bolt shown in FIG. 25.

A self-locking bolt 323 shown in FIG. 28 is provided with locking recesses 324 formed so as to extend from a peripheral region of the bearing surface 303 of a head 301 to a threaded part 302. The depth of each locking recess 324 of the self-locking bolt 323 decreases gradually in a direction opposite a fastening direction A and increases toward the circumference of the bearing surface 303 of the head 301. Since the locking recesses 324 of the self-locking bolt 323 have long radial edges 306, respectively, the locking effect of the self-locking bolt 323 is very high.

As is apparent from the foregoing description, according to the third aspect of the present invention, the height of the locking projections increases gradually in a direction opposite the fastening direction in which the self-locking bolt is turned for fastening, the edges are formed at the highest parts of the locking projections and the height of the edges is nearly equal to or less than P/n, the cumulative locking effect of the n locking projections takes a sufficient locking effect.

The locking recesses have a depth gradually decreasing in a direction opposite a fastening direction A in which the self-locking bolt is turned for fastening and the edge is formed at the intersection of the bearing surface and an axial surface of each locking recess. Therefore, when the self-locking bolt is turned for fastening a member, the lockable member is compressed by the bearing surface and portions of the surface of the lockable member is forced to bulge slightly into the locking recesses in small protrusions. The small protrusions are caught by the edges of the locking recesses, so that the self-locking bolt is locked in place.

What is claimed is:

1. In a combination of a self-locking bolt fastening a lockable member, the improvements of the self-locking bolt comprising:
    a head having a locking function; and
    a threaded part extending from the head and provided with an external thread of a pitch P, the external thread being such as to mate with an internal thread of the lockable member;
    the locking function consisting of n locking projections at equal angular intervals on a bearing surface of the head,
    the locking projections being separated from one another by planar portions of the bearing surface,
    heights of the locking projections from the bearing surface increasing gradually in a direction opposite a fastening direction in which the head is rotated for the fastening to maximum heights,
    edges at the maximum heights,
    the heights of the locking projections decreasing asymmetrically steeply as compared to the increasing gradually from the edges in the direction opposite the fastening direction,
    the maximum heights of the edges being nearly equal to or less than P/n,
    a total area of the planar portions being larger than a total planar projected area of the locking projections, and
    the self-locking bolt having a small diameter not larger than 6 mm,
    wherein the locking projections sink fully into the lockable member for the locking function.

2. The self-locking bolt according to claim 1, wherein the locking projections are formed in a peripheral region of the bearing surface of the head.

3. The self-locking bolt according to claim 1, wherein the locking projections extend from a circumference of the head to the threaded part.

4. In a combination of a self-locking bolt fastening a lockable member without using a nut, the improvements of the self-locking bolt comprising:

a head having a locking function; and a cylindrical threaded part extending from the head and provided with an external thread of a pitch P for mating with an internal thread of the lockable member;

the locking function consisting of n locking recesses at equal angular intervals in a bearing surface of the head, the locking recesses being separated from one another by planar portions of the bearing surface, depths of the locking recesses from the bearing surface decreasing gradually in a direction opposite a fastening direction in which the head is rotated for the fastening to minimum depths, edges at joints of end walls of the locking recesses at positions of maximum depths from the bearing surface, the end walls extending asymmetrically steeply to the bearing surface as compared to the decreasing gradually wherein, when the bearing surface contacts and compresses the lockable member, the edges function so that a portion of the lockable member is forced to bulge into at least one of the locking recesses in a small protrusion as though a locking protrusion had sunk into the lockable member, a total area of the planar portions being larger than a total planar projected area of the locking recesses, and the self-locking bolt having a small diameter not larger than 6 mm for the fastening of the lockable member without using the nut.

5. The self-locking bolt according to claim 4, wherein the locking recesses are formed in a peripheral regions of the bearing surface of the head.

6. The self-locking bolt according to claim 4, wherein the locking recesses extend from a circumference of the head to the threaded part.

* * * * *